United States Patent [19]

Fujii et al.

[11] Patent Number: 4,510,608
[45] Date of Patent: Apr. 9, 1985

[54] LASER TUBE UTILIZING NEGATIVE GLOW

[75] Inventors: Kanichi Fujii; Masahiro Otaka, both of Hitachi, Japan

[73] Assignee: Mita Industrial Co., Ltd., Japan

[21] Appl. No.: 350,965

[22] Filed: Feb. 22, 1982

[30] Foreign Application Priority Data

Aug. 28, 1981 [JP] Japan ................ 56-134337

[51] Int. Cl.³ ............................................ H01S 3/097
[52] U.S. Cl. ...................................... 372/87; 372/88; 372/61; 372/56; 372/85
[58] Field of Search .............. 372/88, 55, 61, 56, 372/85, 87

[56] References Cited

U.S. PATENT DOCUMENTS 3,396,301 8/1968 Kobayashi et al. ............... 372/88
4,021,845 5/1977 Wang .................................. 372/88
4,193,042 3/1980 Wang .................................. 372/88

Primary Examiner—William L. Sikes
Assistant Examiner—Léon Scott, Jr.
Attorney, Agent, or Firm—Beveridge, DeGrandi & Weilacher

[57] ABSTRACT

A laser tube including an anode and a hollow cathode and adapted to obtain laser oscillation by utilizing a negative glow generated in a space within the hollow cathode. The laser tube has an elongate cylindrical member in which the anode and the hollow cathode are disposed opposite to each other, and the hollow cathode has formed therein a plurality of holes for communication between its internal space and the space outside thereof. The laser tube may further include a conducting grid provided in proximity to the anode and a conducting grid provided in a cathode dark space.

25 Claims, 8 Drawing Figures

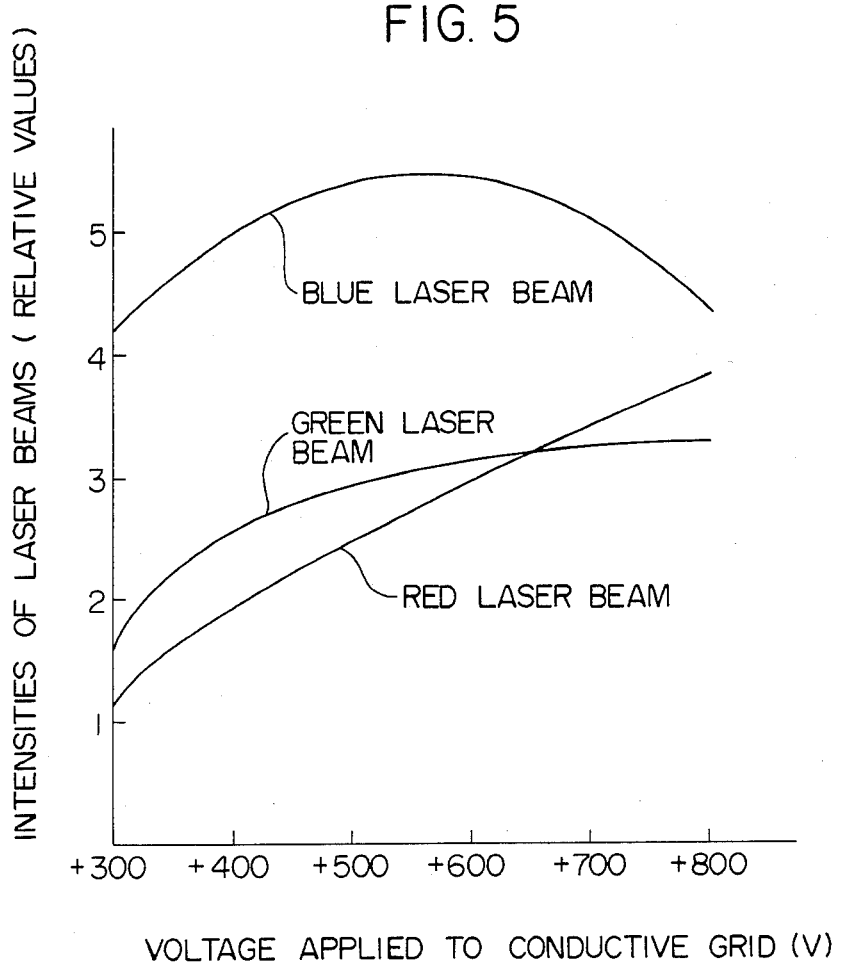

LASER TUBE UTILIZING NEGATIVE GLOW

FIELD OF THE INVENTION

This invention relates to a laser tube utilizing a negative glow, and more specifically to a laser tube including an anode and a hollow cathode and adapte to obtain laser oscillation by utilizing a negative glow generated in a space within the hollow cathode.

DESCRIPTION OF THE PRIOR ART

As is well known to those skilled in the art, a laser tube adapted to obtain laser oscillation by utilizing a negative glow generated in an internal space of a hollow cathode has been suggested as a kind of a gas laser device. One example of this type of laser tube is the flute-type laser tube disclosed at pages 588 and 589 of "Japanese Journal of Applied Physics", Vol. 9, 1970. In this flute-type laser tube, a hollow cathode made up of a flute-like cylindrical member having formed at its top side a plurality of axially spaced holes (which contribute to the generation of a negative glow in a space within the hollow cathode) and a plurality of anodes made up of a plurality of rod-like or needle-like members located respectively opposite to the holes of the hollow cathode and extending substantially at right angles to the axial direction of the hollow cathode are disposed in a closed housing having Brewster windows at its opposite ends. A carrier gas such as helium (He) is enclosed in the closed housing, and a metal such as cadmium (Cd) capable of being converted to a metal vapor which acts as an active medium is charged into the hollow cathode. In such a flute-type laser tube, a negative glow is generated in the internal space of the hollow cathode (i.e., the internal space of the flute-like cylindrical member) and interaction between the negative glow and the metal vapor produces a laser beam.

The flute-type laser tube has the advantage that a metal such as cadmium can be relatively rapidly vaporized by both the heat generated by an electrical discharge and the so-called sputtering action, and therefore, a sufficient amount of the metal vapor can be supplied to the negative glow region within a relatively short period of time and the required laser beam can be emitted in a relatively short period of time. However, it possesses the defect that the metal vapor in the hollow cathode tends to leak out from the holes formed in the hollow cathode and contact, and deposit on, the inside surface of the closed housing which is at a relatively low temperature, and because of the loss of the metal vapor by deposition, the filled metal is consumed relatively early and the operating life of the device is relatively short.

"IEEE Journal of Quantum Electronics", Vol. QE-16, No. 6, June 1980, pages 590–592 discloses a so-called concentric-type laser tube. In the concentric-type laser tube, a hollow cathode made of a cylindrical member of a relatively small diameter having formed therein a plurality of circumferentially and axially spaced holes (some of which contribute to the generation of a negative glow in the internal space of the hollow cathode and the rest of which contribute to communication between the internal space of the hollow cathode and the outside space) and an anode made of a cylindrical member of a relatively large diameter surrounding the hollow cathode concentrically are disposed in a closed housing having brewster windows at its opposite ends. A carrier gas such as helium is enclosed in the closed housing as in the flute-type laser tube. On the other hand, a metal such as cadmium which can be converted to a metal vapor functioning as an active medium is charged into the anode. In such a concentric-type laser tube, a negative glow is generated in the internal space of the hollow cathode, and the metal vapor formed is supplied to the internal space of the hollow cathode through the holes formed in the hollow cathode, whereby a laser beam is emitted by interaction between the negative glow and the metal vapor.

In the concentric-type laser tube, the metal vapor is effectively confined in the anode made of a cylindrical member of a relatively large diameter surrounding the hollow cathode concentrically. Hence, the loss of the metal vapor by deposition on the inside surface of the closed housing as in the flute-type laser tube is reduced, and the laser tube has a fairly longer life than the flute-type laser tube (in this regard, the metal vapor tends to deposit on the inside surface of the anode when the concentric-type laser tube is out of operation, but the metal which has deposited on the inside surface of the anode is again vaporized by the heat generated by an electrical discharge during the operation of the laser tube and thus effectively utilized). The concentric-type laser tube, however, presents different problems to be solved as shown below.

(A) Since the metal loaded in the anode is located away from the hollow cathode, no sputtering action is exerted on the metal. Evaporation of the metal, therefore, is effected substantially only by the heat generated by electrical discharging, and a relatively long period of time is required for vaporizing the metal and emit a laser beam. Furthermore, even after laser emission, it is difficult to supply a sufficient amount of metal vapor to the negative glow region in the hollow cathode, and therefore, the laser beam cannot be produced stably as required (to remove this defect, it may be possible to charge the metal in to the hollow cathode; but as can be easily understood, this results in limitation of the amount of the metal to be charged and shortening of the operating life of the tube).

(B) The hollow cathode is located concentrically inwardly of the anode and the space between the outside surface of the hollow cathode and the inside surface of the anode hampers the dissipation of heat in the negative glow region in the hollow cathode. Consequently, the temperatures of the carrier gas and the metal vapor rise excessively in the negative glow region of the hollow cathode to increase the so-called Doppler width. Hence, the laser gain is reduced and the laser emission becomes unstable.

The conventional flute-type and concentric-type laser tubes have additional problems to be solved. Firstly, the negative glow generated in the internal space of the hollow cathode is not sufficiently uniform in the axial direction of the hollow cathode. Non-uniformity in the negative glow causes considerable "noises" in the laser beam emitted. Secondly, it is extremely difficult, or impossible, to control the emitted laser beam, particularly its colors (for example, the relative strengths of a blue laser beam, a green laser beam and a red laser beam in the emitted laser beam).

SUMMARY OF THE INVENTION

It is a first object of this invention therefore to provide a novel and excellent laser tube utilizing a negative glow which can emit a laser beam stably as required over long periods of time (namely having the advantages of both the flute-type laser tube and the concentric-type laser tube).

A second object of this invention is to provide an improved laser tube utilizing a negarive glow, in which the negative glow generated in a space within a hollow cathode is sufficiently uniform in the axial direction of the hollow cathode, and which therefore can emit a laser beam having much reduced noises.

A third object of this invention is to provide an improved laser tube utilizing a negative glow, which permits an emitted laser beam, particularly its colors, to be controlled easily as required.

To achieve the first object, the present invention provides a laser tube including an anode and a hollow cathode and adapted to obtain laser oscillation by utilizing a negative glow generated in a space within the hollow cathode, characterized in that said laser tube has an elongate cylindrical member in which the anode and the hollow cathode are disposed opposite to each other, and that a plurality of holes for penetration between the internal space of the hollow cathode and the space outside of the hollow cathode are formed in the hollow cathode.

To achieve the second object, the present invention provides a laser tube including an anode and a hollow cathode and adapted to obtain laser oscillation by utilizing a negative glow generated in a space within the hollow cathode, characterized in that said tube includes a conductive grid located in proximity to the anode.

To achieve the third object, the present invention provides a laser tube including an anode and a hollow cathode and adapted to obtain laser oscillation by utilizing a negative glow generated in a space within the hollow cathode, characterized in that said tube includes a conductive grid at a cathod dark space.

BRIEF DESCRIPTION OF THE DRAWINGS

FIG. 5 is a graph showing the results of the measurement in the working example.

DETAILED DESCRIPTION OF THE PREFERRED EMBODIMENTS

Figure 1:
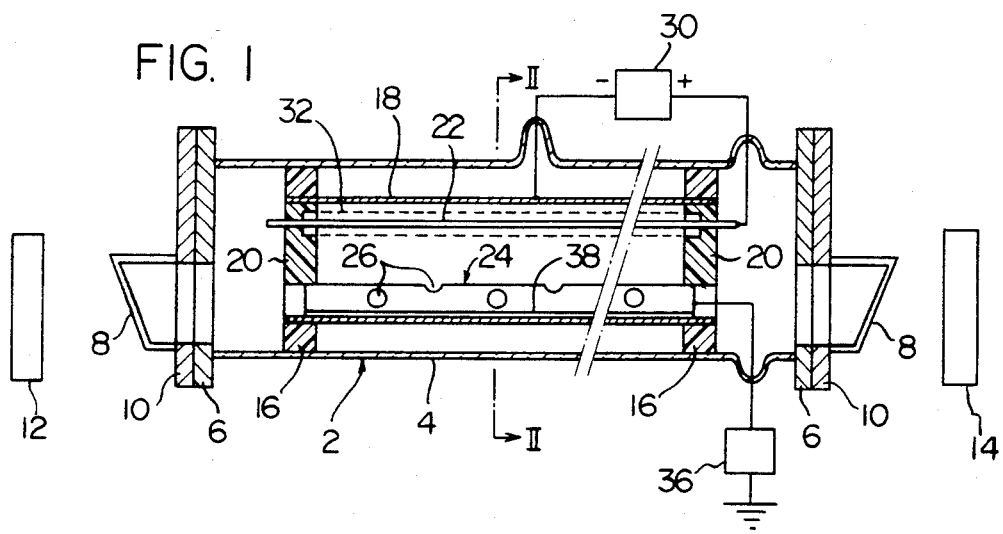
FIG. 1 is a simplified longitudinal sectional view showing a preferred embodiment of the laser tube constructed in accordance with the present invention.
Figure 2:
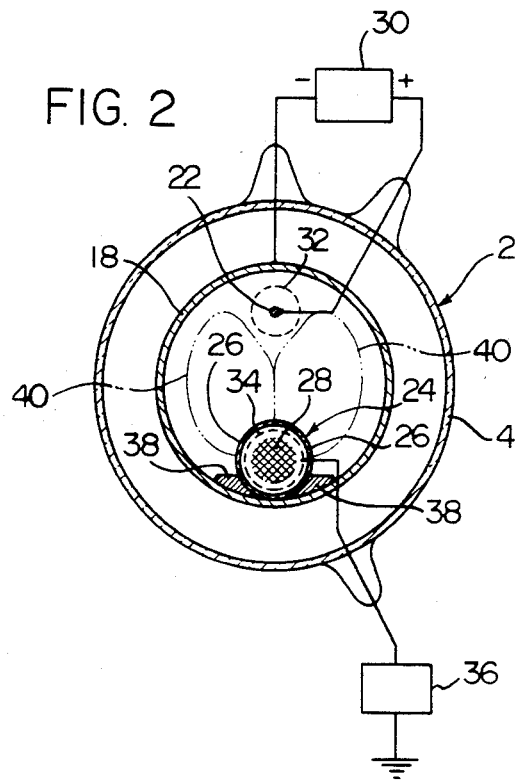
FIG. 2 is a simplified cross-sectional view taken along line II—II of FIG. 1.

With reference to FIGS. 1 and 2 showing one preferred embodiment of the laser tube constructed in accordance with this invention, the laser tube includes a closed housing shown generally at 2. The closed housing 2 has a generally cylindrical main portion 4 made conveniently of a suitable glass material. Flanges 6 are provided at the opposite ends of the main portion 4. To each of the flanges 6 is fixed by a suitable method a flange 10 provided in a Brewster window 8 known per se. Thus, the Brewster windows 8 are fixed to the opposite ends of the main portion 4. The flanges 6 and 10 each have an opening at a position corresponding to the Brewster window 8. Laser optical cavities 12 and 14 are positioned in place by suitable supporting mechanisms (not shown) outwardly of the respective Brewster windows 8.

Within the closed housing 2, a cylindrical member 18 is held at a predetermined position by a pair of annular spacers 16 formed of a suitable electrically insulating material. Generally, the cylindrical member 18 is conveniently in the form of a circular cylinder of a relatively large diameter having a circular sectional contour as clearly illustrated in FIG. 2, although it may have a sectional contour of a polygonal shape such as a square or a regular hexagon. It is also convenient that the cylindrical member 18 is positioned concentrically with respect to the main portion 4 of the closed housing 2. Preferably, the cylindrical member 18 is made of a highly conductive material such as copper as will be mentioned hereinbelow.

A pair of spacers 20 formed of a suitable electrically insulating material are disposed within the opposite end portions of the cylindrical member 18. By this pair of spacers 20, an anode 22 and a hollow cathode 24 are positioned opposite to each other within the cylindrical member 18. In the illustrated embodiment, the anode 22 which may be formed of a suitable material such as tungsten is made up of an elongate rod-shaped member and is disposed in the upper part of the inside of the cylindrical member 18 such that it is spaced from the inside surface of the cylindrical member 18 and extends substantially parallel to the axis of the cylindrical member 18. On the other hand, in the illustrated embodiment, the hollow cathode 24 which may be made of a suitable material such as stainless steel is made up of a cylindrical member of a relatively small diameter having formed in its circumferential wall a plurality of holes 26 which are located at suitable intervals in the axial and circumferential directions. As clearly shown in FIG. 2, the hollow cathode 24 is disposed at the lower end portion of the inside of the cylindrical member 18 so that it makes contact with the inside surface of the cylindrical member 18 and extends substantially parallel to the axis of the cylindrical member 18. The holes 26 formed on the circumferential wall of the cylindrical member constituting the hollow cathode 24 function both as communication holes for communication between a space 28 within the hollow cathode 24 and the space outside of the hollow cathode 24 and as discharging holes for generating a negative glow in the internal space 28 (FIG. 2) of the hollow cathode 24. More specifically, those holes 26 which are located on the top side of the cylindrical member constituting the hollow cathode 24 function both as electrical discharge holes and communication holes, and those holes 26 which are located on both side surfaces function as communication holes.

A direct-current discharge voltage is applied across the anode 22 and the hollow cathode 24. In the illustrated embodiment, the positive terminal of a direct-current discharge power supply 30 is directly connected to the anode 22, but the negative terminal of the DC power supply 30 is connected to the cylindrical member 18 and therefore connected to the hollow cathode 24 through the cylindrical member 18 made of a highly conductive material. It will be appreciated therefore that in the illustrated embodiment, the cylindrical member 18 also functions as a cathode.

The illustrated embodiment further includes a conductive grid 32 located in proximity to the anode 22 and a conductive grid 34 (FIG. 2) located in a cathode dark space of the hollow cathode 24. The conductive grid 32 which may be formed of a stainless steel mesh is cylindrical and positioned so as to surround the anode 22 concentrically. Likewise, the conductive grid 34 which may be formed of a stainless steel mesh is cylindrical and is positioned in the dark region of the hollow cathode 24 (i.e., in the neighborhood of the inside surface of the hollow cathode 24) concentrically with the hollow cathode 24. As shown in FIG. 2, a direct-current grid power supply 36, preferably adapted for free adjustment of voltage, is connected to the conductive grid 34. If desired, a direct-current grid power supply (not shown) may also be connected to the conductive grid 32.

In the laser tube of the above construction, the air is removed from the closed housing 2, and a suitable carrier gas such as helium is enclosed in it. A metal 38, such as cadmium, which can be vaporized to a metal vapor is charged into the lower end portion of the inside of the cylindrical member 18 near the site of contact between the cylindrical member 18 and the hollow cathode 24. The metal 38 may be in the form of a powder or granules. But in order to distribute it substantially uniformly in the axial direction of the hollow cathode 24, it is conveniently in the form of a rod which has a substantially uniform sectional shape and extends axially of the hollow cathode 24.

Now, the operation and result of the laser tube described above will be described. It will be readily appreciated that when a direct-current discharge voltage is applied across the anode 22 and the cylindrical member 18 and hollow cathode 24 by the DC discharge power supply 30, a negative glow is generated in the internal space 28 (the part marked with crossing fine lines in FIG. 2) of the hollow cathode 24. The metal 38 is vaporized relatively rapidly by the heat generated by the electrical discharge and the sputtering action. The metal vapor circulates together with the enclosed carrier gas within the cylindrical member 18 as shown by two-dotted chain lines 40 in FIG. 2, and is supplied to the internal space 28 of the hollow cathode 24 in which the negative glow is generated. Consequently, a laser beam is emitted in the internal space 28 of the hollow cathode 24 by the interaction between the negative glow and the metal vapor. The emitted laser beam, as in the case of conventional laser tubes, is amplified by the laser optical cavities 12 and 14 and taken outside through one of the laser optical cavities 12 and 14.

In the laser tube described above, the metal is vaporized relatively rapidly and effectively by the heat generated by the electrical discharging and the sputtering action, and the metal vapor is effectively supplied to the internal space 28 of the hollow cathode 24 by circulation as shown by the two-dotted chain lines 40 in FIG. 2. Hence, the required laser beam can be emitted in a relatively short period of time, and emission of the required laser beam is stable. The metal vapor is effectively confined within the cylindrical member 18, and therefore, the loss of the metal vapor by deposition onto the inner surface of the closed housing 2 is reduced. Moreover, a sufficient amount of the metal can be loaded in the cylindrical member 18, and the tube has a sufficiently long operating life. In addition, the internal space 28 of the hollow cathode 24 is effectively cooled by the circulation of the carrier gas and the metal vapor as shown by the two-dotted chain lines 40 in FIG. 2, and the heat in the internal space 28 of the hollow cathode 24 is dissipated fully effectively through the hollow cathode 24 and the cylindrical member 18 directly in contact therewith. Accordingly, the reduction of the laser gain as a result of broadening of the so-called Doppler width can be effectively prevented, and the required laser beam is produced stably.

Now, the operation and result of the conductive grid 32 positioned in proximity to the anode 22 will be described. When the conductive grid 32 is absent, the non-uniformity of the surface of the anode 22 in the axial direction tends to make the electrical discharge between the anode 22 and the hollow cathode 24 non-uniform in the axial direction and lead to the generation of a non-uniform negative glow within the internal space 28 of the hollow cathode 24, and an arc discharge tends to occur locally between the anode 22 and the hollow cathode 24. When the conductive grid 32 is provided in proximity to the anode 22, the potential of the discharging space is rendered equal in the axial direction at the site of the conductive grid 32 and made uniform in the axial direction, and movement of electrons between the anode 22 and the hollow cathode 24 is controlled by the conductive grid 32. For this reason, the discharge between the anode 22 and the hollow cathode 24 is made uniform in the axial direction and a local arc discharge is avoided. Furthermore, a negative glow which is sufficiently uniform in the axial direction is generated in the internal space 28 of the hollow cathode 24, and thus, an excellent laser beam having much reduced noises can be produced. As required, the discharge between the anode 22 and the hollow cathode 24 can be made more uniform by applying a positive (or negative) DC grid voltage (desirably having a sufficiently small pulse current component) to the conductive grid 32.

The operation and result of the conductive grid 34 positioned in the cathode dark space of the hollow cathode 24 will now be described. The provision of the conductive grid 34 at the cathode dark space of the hollow cathode 24 changes the cathode fall voltage and therefore the energy of the electrons to be plunged into the negative glow. The changes of the energy of the electrons cause changes in the color of the emitted laser beam, more specifically the relative intensities of the blue, green and red laser beams. The degree of changes in the energy of the electrons to be plunged into the negative glow depends upon such factors as the mesh size of the conductive grid 34, the electrical distance between the inner surface of the hollow cathode 24 and the conductive grid 34, and the magnitude of the positive or negative voltage applied to the conductive grid 34 by the DC grid power supply 36. Accordingly, if these factors are properly predetermined, the color of the laser beam emitted can be controlled as required. In particular, the voltage applied to the conductive grid 34 by the DC grid power supply 36 can be very easily adjusted by using a power supply which permits free adjustment of voltage as the DC grid voltage 36. Hence, by adjusting the voltage applied to the conductive grid 34, the colors of the laser beam emitted can be very easily adjusted.

Although the invention has been described hereinabove with reference to the preferred embodiment illustrated in FIGS. 1 and 2, it should be understood that the invention is in no way limited to this specific embodiment, and various changes and modification are possible without departing from the scope of the invention.

For example, in the above embodiment, the hollow cathode 24 is electrically contacted with the cylindrical member 18 by contacting a part of the outside surface of the hollow cathode 24 directly with a part of the inside surface of the cylindrical member 18. If desired, this electrical connection may be effected through a suitable conductive member.

Although in the above embodiment, the cylindrical member 18 is made of a conductive material and the hollow cathode 24 is electrically connected to the cylindrical member 18 to thereby cause the cylindrical member 18 to function as a cathode, it is possible, if desired, to make the cylindrical member 18 from an electrically insulating material or electrically insulate the cylindrical member 18 from the hollow cathode 24 and to connect the negative terminal of the DC discharge power supply 30 directly to the hollow cathode 24 instead of the cylindrical member 18 (whereby the cylindrical member 18 does not function as a cathode).

Furthermore, although in the above embodiment, the cylindrical member 18 is disposed within the closed housing 2 having the main portion 4, it is possible, if desired, to utilize the cylindrical member 18 itself as the main portion of the closed housing 2, thus omitting the main portion 4 in the above embodiment.

Figure 3:
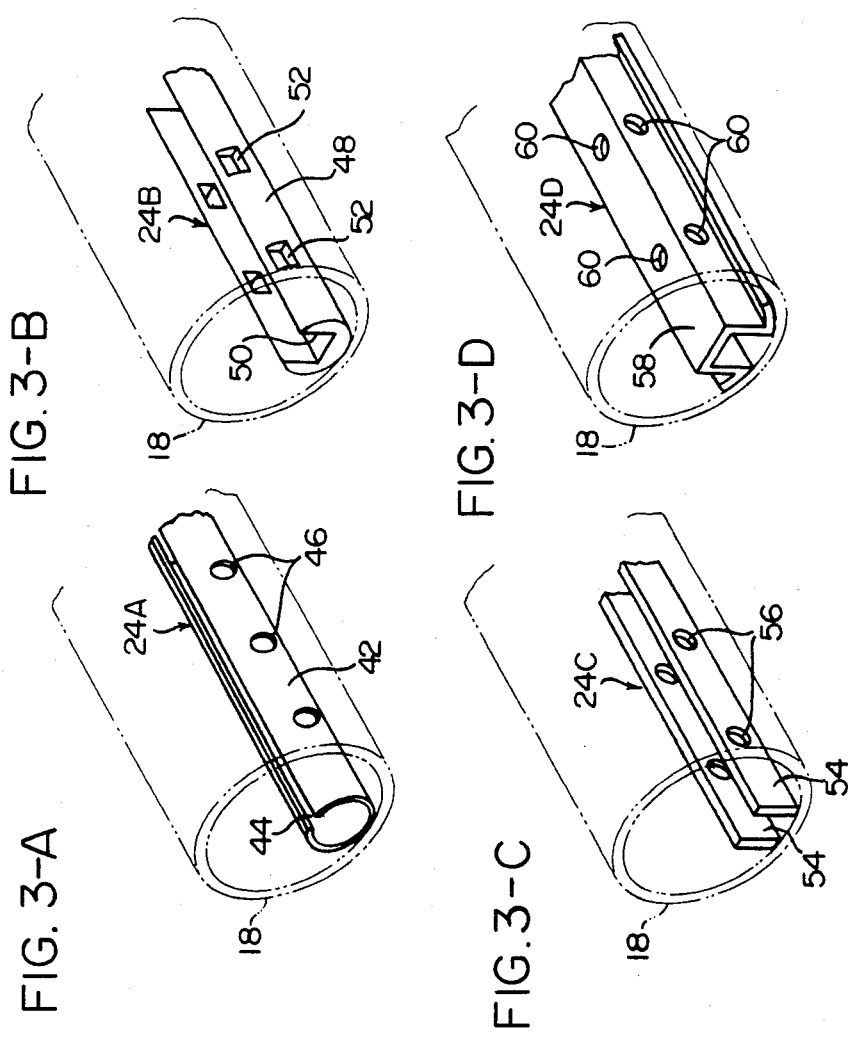
FIGS. 3-A, 3-B, 3-C and 3-D are partial perspective views showing modified examples of the hollow cathode.

The hollow cathode 24 is not limited to the shape illustrated in FIGS. 1 and 2, and it may be of any desired shape so long as it defines the internal space within which to generate a negative glow and has formed therein a plurality of penetration holes for communication between the internal space and the space outside thereof. For example, it may be of the shapes shown in FIGS. 3-A, 3-B, 3-C and 3-D. The hollow cathode 24A shown in FIG. 3-A is constructed by forming an elongate hole 44 extending continuously in the axial direction on the top side of a cylindrical member 42 and providing a plurality of axially spaced circular holes 46 on both side surfaces of the cylindrical member 42. In the hollow cathode 24B shown in FIG. 3-B, a channel 50 is formed in the upper half part of a cylinder 48 to define an internal space having an open top. On both side surfaces of the channel 50 a plurality of rectangular holes 52 are formed in spaced-apart relationship in the axial direction. The hollow cathode 24C shown in FIG. 3-C is constructed of two elongate flat plates 54 which are spaced from each other and extend parallel to each other to define an internal space therebetween. Each of the two flat plates 54 has a plurality of axially spaced circular holes 56. The hollow cathode 24D shown in FIG. 3-D is constructed of an elongate member 58 whose cross section is nearly of the shape of an inverted letter U. A plurality of circular holes 60 spaced in the axial direction are formed on each of the top side and both side surfaces of the member 58.

Whilst the above description has been directed to a laser tube in which a cadmium vapor is used as an active medium together with a carrier gas such as helium, the present invention can also be applied to a laser tube in which a gas such as nitrogen ($N_2$), krypton (Kr), argon (Ar) and carbon dioxide ($CO_2$) or a vapor of a metal such as iodine ($I_2$), selenium (Se), zinc (Zn) and arsenic (As), either singly or in suitable combinations, is used as an active medium with or without a suitable carrier gas.

Another important point is that although the two basic technological ideas in the second and third aspects of the invention, namely (i) the provision of a conductive grid in proximity to the anode to permit emission of an excellent laser beam having much reduced noises, and (ii) the provision of a conductive grid in the cathode dark space of the hollow cathode to permit presetting or adjustment of the color of the emitted laser beam, have been explained hereinabove in relation to the laser tube according to the first aspect of the invention in which the anode 22 and the hollow cathode 24 are disposed opposite to each other in the cylindrical member 18 to achieve excellent operating results such as the increase of the life of the laser tube and the stabilization of the emitted laser beam, these two basic technical ideas can also be applied, either singly or in combination, to laser tubes of various forms such as the aforesaid flute-type and concentric-type laser tubes or a laser tube having an anode placed in a cylindrical hollow cathode contrary to the known concentric-type laser tube (in the last-mentioned type, the cylindrical hollow cathode itself can also be utilized as the main portion of the closed housing).

In order to ascertain changes in the color of a laser beam emitted according to changes in the voltage to be applied to a conductive grid disposed in the cathode dark space of a hollow cathode, an experiment was conducted as shown in Example below using a laser tube of the type illustrated in FIG. 4.

EXAMPLE

Figure 4:
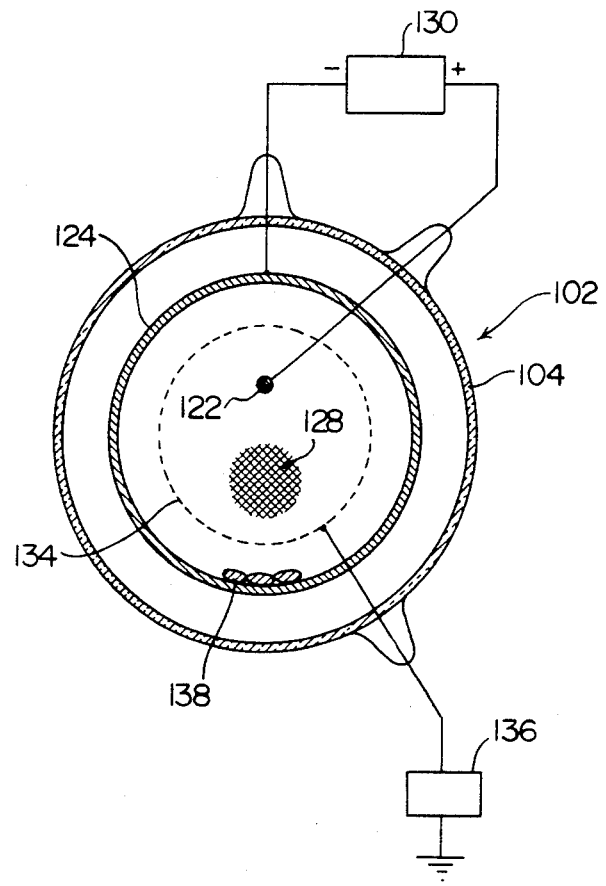
FIG. 4 is a simplified cross-sectional view of the laser tube used in a working example given hereinbelow.

In the laser tube illustrated in FIG. 4, a hollow cathode 124 formed of a stainless steel cylindrical member having an inside diameter of 12 mm, a thickness of 1 mm and a length of 700 mm is disposed concentrically in a closed housing 102 having a cylindrical glass member with an inside diameter of 17 mm as a main portion 104. In the hollow cathode 124 is concentrically arranged a conductive grid 134 formed of a stainless steel cylindrical mesh having an inside diameter of 9 mm, a mesh opening width of 0.4 mm and a length of 750 mm. An anode 122 formed of a round stainless steel rod having a diameter of 2 mm and a length of 800 mm is disposed within the conductive grid 134 at a position about 4.5 mm above the axis of the conductive grid 134. A helium gas under a pressure of 14 torr was enclosed in the closed housing 102, and cadmium 138 was loaded in the hollow cathode 124, and the pressure of a vapor of cadmium in operation was adjusted to $5 \times 10^{-3}$ torr.

In the laser tube of the above specification, a discharge voltage of 1000 V (discharge current of 1 A) was applied across the anode 122 and the hollow cathode 124 by means of a DC discharge power supply 130. Thus, a laser beam was emitted in a space 128 marked with crossing fine lines. At this time, the voltage to be applied to the conductive grid 134 by a DC grid power supply 136 was varied within the range of from +300 V to +800 V, and the emitted laser beam was spectrally resolved into a blue laser beam, a green laser beam and red laser beam and the relative intensities of the individual beams were measured (when the voltage applied to the conductive grid 134 exceeded +800 V, electrical discharging and laser emission became unstable).

The results are shown in FIG. 5. It will be seen from FIG. 5 that according to changes in the voltage applied to the conductive grid 134 disposed in the dark region of the hollow cathode 124, the relative intensities of the blue, green and red laser beams change according to different characteristics, and therefore, the color of the emitted laser beam is changed.

What is claimed is:

1. In a laser tube including an anode and a hollow cathode and adapted for laser oscillation utilizing a negative glow generated in a space within the hollow cathode, the improvement wherein said laser tube includes an elongate cylindrical member in which the anode and the hollow cathode are disposed opposite to each other, means are included electrically insulating the anode from the cylindrical member, an active vaporizable metal is provided in the cylindrical member closely adjacent the outer surface of the hollow cathode, and in contact with said cylindrical member and a plurality of holes for communication between the internal space of the hollow cathode and the space outside thereof are formed in the hollow cathode.

2. The laser tube of claim 1 wherein the tube includes a closed housing having Brewster windows at its opposite ends, and said cylindrical member is disposed within the closed housing.

3. The laser tube according to claim 2 wherein a carrier gas is enclosed in the closed housing.

4. The laser tube of any one of claims 1 to 3 wherein the cylindrical member is formed of a conductive material, and wherein the hollow cathode is electrically connected to the cylindrical member and the cylindrical member also functions as a cathode.

5. The laser tube of claim 4 wherein the hollow cathode is electrically connected to the cylindrical member by contacting a part of its outside surface directly with a part of the inner surface of the cylindrical member.

6. The laser tube of claim 1 wherein the cylindrical member is of the shape of a circular cylinder having a relatively large diameter.

7. The laser tube of claim 1 wherein the hollow cathode is made of a circular cylindrical member of a relatively small diameter having a plurality of holes formed in its circumferential wall.

8. The laser tube of claim 1 wherein the anode is made of a rod-like member extending substantially parallel to the hollow cathode.

9. The laser tube of claim 1 wherein a conductive grid located in proximity to the anode is disposed within the cylindrical member.

10. The laser tube of claim 9 wherein the conductive grid is of the shape of a circular cylinder surrounding the anode concentrically.

11. The laser tube of claim 1 wherein a conductive grid located in the cathode space is disposed within the cylindrical member.

12. The laser tube of claim 11 further including means for applying a direct-current voltage to the conductive grid.

13. The laser tube of claim 12 wherein the applying means is adjustable.

14. In a laser tube including an anode and a hollow cathode and adapted for laser oscillation utilizing a negative glow generated in a space within the hollow cathode, the improvement wherein said laser tube includes a conductive grid located concentric with the anode.

15. In a laser tube including an anode and a hollow cathode and adapted for laser oscillation utilizing a negative glow generated in a space within the hollow cathode, the improvement wherein said laser tube includes a conductive grid located in a cathode dark space of the cathode.

16. The laser tube of claim 15 further comprising means for applying a direct-current voltage to the conductive grid.

17. The laser tube of claim 16 wherein the applying means is adjustable.

18. In a laser tube including an anode and a hollow cathode and adapted for laser oscillation utilizing a negative glow generated in a space within the hollow cathode, the improvement wherein said laser tube includes an elongate cylindrical member, formed of a conductive material, in which the anode and the hollow cathode are disposed opposite to each other, a plurality of holes for communication between the internal space of the hollow cathode and the space outside thereof are formed in the hollow cathode, the laser tube includes a closed housing having Brewster windows at its opposite ends, with said cylindrical member disposed within the closed housing, a carrier gas is enclosed in the closed housing, an active vaporizable metal is in contact with the cylindrical member, and the anode is electrically insulated from the cylindrical member but the hollow cathode is electrically connected to the cylindrical member and the cylindrical member also functions as a cathode.

19. The laser tube of claim 18 wherein the hollow cathode is electrically connected to the cylindrical member by contacting a part of its outside surface directly with a part of the inner surface of the cylindrical member.

20. In a laser tube including an anode and a hollow cathode and adapted for laser oscillation utilizing a negative glow generated in a space within the hollow cathode, the improvement wherein said laser tube includes an elongate cylindrical member in which the anode and the hollow cathode are disposed opposite to each other with a conductive grid disposed within the cylindrical member concentric with the anode, and wherein a plurality of holes for communication between the internal space of the hollow cathode and the space outside thereof are formed in the hollow cathode.

21. The laser tube of claim 20 wherein the conductive grid is of the shape of a circular cylinder surrounding the anode concentrically.

22. In a laser tube including an anode and a hollow cathode and adapted to obtain laser oscillation by utilizing a negative glow generated in a space within the hollow cathode, the improvement wherein said laser tube has an elongate cylindrical member in which the anode and the hollow cathode are disposed opposite to each other with a conductive grid disposed within the cylindrical member in the space within the cathode, and wherein a plurality of holes for communication between the internal space of the hollow cathode and the space outside thereof are formed in the hollow cathode.

23. The laser tube of claim 22 further including means for applying a direct-current voltage to the conductive grid.

24. The laser tube of claim 23 wherein the applying means is adjustable.

25. In a laser tube including an anode and a hollow cathode and adapted for laser oscillation utilizing a negative glow generated in a space within the hollow cathode, the improvement wherein said laser tube includes an elongate cylindrical member in which the anode and the hollow cathode are disposed opposite to each other, means are included electrically insulating the anode from the cylindrical member, an active vaporizable metal is provided in the cylindrical member so that the metal is vaporized by the sputtering action and the heat generated by the electrical discharge.

* * * * *